US011840452B2

(12) United States Patent
Yamaji et al.

(10) Patent No.: US 11,840,452 B2
(45) Date of Patent: Dec. 12, 2023

(54) SPHERICALLY-SHAPED COATED GRAPHITE, NEGATIVE ELECTRODE FOR LITHIUM ION SECONDARY BATTERY, AND LITHIUM ION SECONDARY BATTERY

(71) Applicants: JFE CHEMICAL CORPORATION, Tokyo (JP); JFE STEEL CORPORATION, Tokyo (JP)

(72) Inventors: Ryota Yamaji, Tokyo (JP); Yasushi Madokoro, Tokyo (JP); Akira Matsuzaki, Tokyo (JP); Yusuke Fushiwaki, Tokyo (JP); Mikito Suto, Tokyo (JP)

(73) Assignees: JFE Chemical Corporation, Tokyo (JP); JFE Steel Corporation, Tokyo (JP)

( * ) Notice: Subject to any disclaimer, the term of this patent is extended or adjusted under 35 U.S.C. 154(b) by 0 days.

(21) Appl. No.: 18/030,097

(22) PCT Filed: Jul. 28, 2022

(86) PCT No.: PCT/JP2022/029174
§ 371 (c)(1),
(2) Date: Apr. 4, 2023

(87) PCT Pub. No.: WO2023/021958
PCT Pub. Date: Feb. 23, 2023

(65) Prior Publication Data
US 2023/0286806 A1    Sep. 14, 2023

(30) Foreign Application Priority Data
Aug. 17, 2021    (JP) ................................ 2021-132828

(51) Int. Cl.
*C01B 32/21* (2017.01)
*H01M 4/36* (2006.01)
(Continued)

(52) U.S. Cl.
CPC ............. *C01B 32/21* (2017.08); *H01M 4/366* (2013.01); *H01M 4/583* (2013.01);
(Continued)

(58) Field of Classification Search
CPC ....... C01B 32/21; H01M 4/366; H01M 4/583; H01M 10/0525; H01M 2004/021;
(Continued)

(56) References Cited

U.S. PATENT DOCUMENTS

| | | | |
|---|---|---|---|
| 2009/0196816 A1 | 8/2009 | Yamamoto et al. | |
| 2017/0187041 A1* | 6/2017 | Yamada | ................ H01M 4/583 |
| 2021/0122639 A1 | 4/2021 | Choi et al. | |

FOREIGN PATENT DOCUMENTS

| | | |
|---|---|---|
| CN | 110078065 A | 8/2019 |
| CN | 111517319 A | 8/2020 |

(Continued)

OTHER PUBLICATIONS

International Search Report and Written Opinion for International Application No. PCT/JP2022/029174, dated Sep. 20, 2022, 6 pages.
(Continued)

*Primary Examiner* — Daniel S Gatewood
(74) *Attorney, Agent, or Firm* — RatnerPrestia

(57) ABSTRACT

Provided is spherically-shaped coated graphite exhibiting excellent cycle capacity-maintaining property when used as a negative electrode material for a lithium ion secondary battery. The spherically-shaped coated graphite includes: spherically-shaped graphite in which primary particles with an equivalent spherical diameter of not more than 0.8 μm have a volume ratio of more than 40.0% and not more than 70.0%, and primary particles with an equivalent spherical diameter of not less than 1.5 μm and not more than 3.0 μm have a volume ratio of not less than 3.0% and not more than 17.0%, in a particle size distribution of primary particles
(Continued)

obtained using X-ray computed tomography; and a carbonaceous substance covering the spherically-shaped graphite, and a pore volume of pores with a pore size of 7.8 nm to 36.0 nm is not more than 0.017 cm$^3$/g, and a mass of infiltrated dibutyl phthalate is less than 0.70 g/cm$^3$.

17 Claims, 7 Drawing Sheets

(51) Int. Cl.
*H01M 4/583* (2010.01)
*H01M 10/0525* (2010.01)
*H01M 4/02* (2006.01)

(52) U.S. Cl.
CPC ..... *H01M 10/0525* (2013.01); *C01P 2004/32* (2013.01); *C01P 2004/51* (2013.01); *C01P 2004/61* (2013.01); *C01P 2006/12* (2013.01); *C01P 2006/14* (2013.01); *H01M 2004/021* (2013.01); *H01M 2004/027* (2013.01)

(58) Field of Classification Search
CPC .......... H01M 2004/027; C01P 2004/32; C01P 2004/51; C01P 2004/61; C01P 2006/12; C01P 2006/14
See application file for complete search history.

(56) References Cited

FOREIGN PATENT DOCUMENTS

| | | |
|---|---|---|
| CN | 112368864 A | 2/2021 |
| CN | 112499624 A | 3/2021 |
| JP | 2012216537 A | 11/2012 |
| JP | 2012216545 A | 11/2012 |
| JP | 2014146607 A | 8/2014 |
| JP | 2016105396 A | 6/2016 |
| JP | 2017134937 A | 8/2017 |
| TW | 201345031 A | 11/2013 |
| WO | 2021166812 A1 | 8/2021 |

OTHER PUBLICATIONS

Taiwanese Office Action for Taiwanese Application No. 111130741, dated Apr. 13, 2023, with partial English translation, 8 pages.

Korean Office Action for Korean Application No. 10-2023-7011485, dated Jul. 24, 2023 with Concise Statement of Relevance of Office Action, 4 pages.

* cited by examiner

SPHERICALLY-SHAPED COATED GRAPHITE, NEGATIVE ELECTRODE FOR LITHIUM ION SECONDARY BATTERY, AND LITHIUM ION SECONDARY BATTERY

CROSS REFERENCE TO RELATED APPLICATIONS

This is the U.S. National Phase application of PCT/JP2022/029174, filed Jul. 28, 2022, which claims priority to Japanese Patent Application No. 2021-132828, filed Aug. 17, 2021, the disclosures of these applications being incorporated herein by reference in their entireties for all purposes.

FIELD OF THE INVENTION

The present invention relates to spherically-shaped coated graphite, a negative electrode for a lithium ion secondary battery, and a lithium ion secondary battery.

BACKGROUND OF THE INVENTION

The lithium ion secondary battery of the invention includes a negative electrode, a positive electrode, and a non-aqueous electrolyte as main components. Lithium ions move between the negative electrode and the positive electrode in the discharging and charging processes, thereby causing a secondary battery to operate.

Conventionally, graphite that is processed into a spherical shape (spherically-shaped graphite) may be used as a negative electrode material for a lithium ion secondary battery (Patent Literature 1).

PATENT LITERATURE

Patent Literature 1: JP 2014-146607 A

SUMMARY OF THE INVENTION

A negative electrode material for a lithium ion secondary battery is required to have excellent cycle capacity-maintaining property in some cases.

In particular, it is expected that many lithium ion secondary batteries will be mounted on vehicles (including hybrid vehicles and electric vehicles). For instance, in an electric vehicle, charging and discharging processes are repeated, and a better battery life is achieved when the cycle capacity-maintaining property is more excellent.

Accordingly, aspects of the present invention have an object to provide spherically-shaped coated graphite that exhibits excellent cycle capacity-maintaining property when used as a negative electrode material for a lithium ion secondary battery.

The present inventors found, through an earnest study, that employing the configuration described below enables the achievement of the above-mentioned object, and aspects of the invention have thus been completed.

Specifically, aspects of the present invention provide the following [1] to [6].

[1] Spherically-shaped coated graphite including: spherically-shaped graphite in which primary particles with an equivalent spherical diameter of not more than 0.8 μm have a volume ratio of more than 40.0% and not more than 70.0%, and primary particles with an equivalent spherical diameter of not less than 1.5 μm and not more than 3.0 μm have a volume ratio of not less than 3.0% and not more than 17.0%, in a particle size distribution of primary particles that is obtained using X-ray computed tomography; and a carbonaceous substance covering the spherically-shaped graphite, wherein a pore volume of pores with a pore size of not less than 7.8 nm and not more than 36.0 nm is not more than 0.017 $cm^3$/g, and a mass of infiltrated dibutyl phthalate is less than 0.70 $g/cm^3$.

[2] The spherically-shaped coated graphite according to [1], wherein in the spherically-shaped graphite, secondary particles in a spherical shape have a volume ratio of not less than 3.0% and not more than 26.0%, and secondary particles in a rod shape have a volume ratio of not less than 20.0% and not more than 70.0%, in a particle shape distribution of secondary particles that is obtained using X-ray computed tomography.

[3] The spherically-shaped coated graphite according to [1] or [2], wherein an average secondary particle diameter is not less than 5.0 μm and not more than 15.0 μm, and a specific surface area is not less than 0.5 $m^2$/g and not more than 10.0 $m^2$/g.

[4] The spherically-shaped coated graphite according to any one of [1] to [3], wherein the spherically-shaped graphite is formed of natural graphite processed into a spherical shape.

[5] A negative electrode for a lithium ion secondary battery, wherein the negative electrode contains the spherically-shaped coated graphite according to any one of [1] to [4].

[6] A lithium ion secondary battery including the negative electrode according to [5].

According to aspects of the invention, it is possible to provide spherically-shaped coated graphite that exhibits excellent cycle capacity-maintaining property when used as a negative electrode material for a lithium ion secondary battery.

DETAILED DESCRIPTION OF EMBODIMENTS OF THE INVENTION

[Spherically-Shaped Coated Graphite]

Figure 1A:
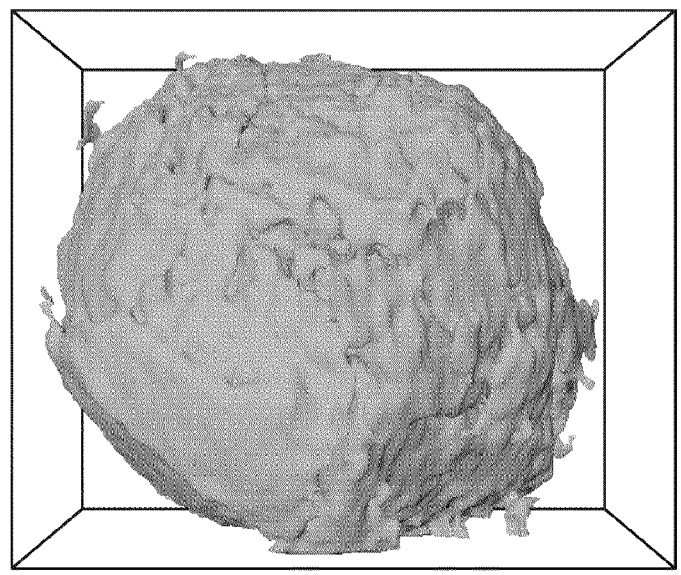
FIG. 1A is a three-dimensional image of a spherical particle.
Figure 1B:
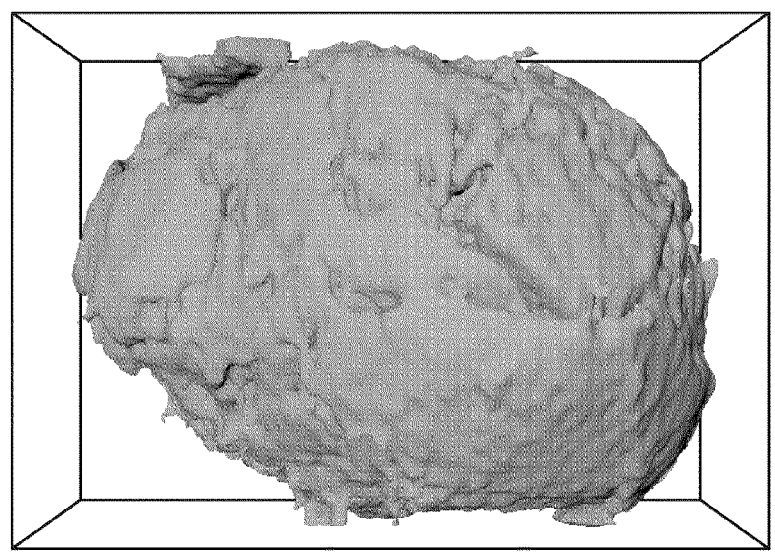
FIG. 1B is a three-dimensional image of the spherical particle observed from a different angle from FIG. 1A.
Figure 1C:
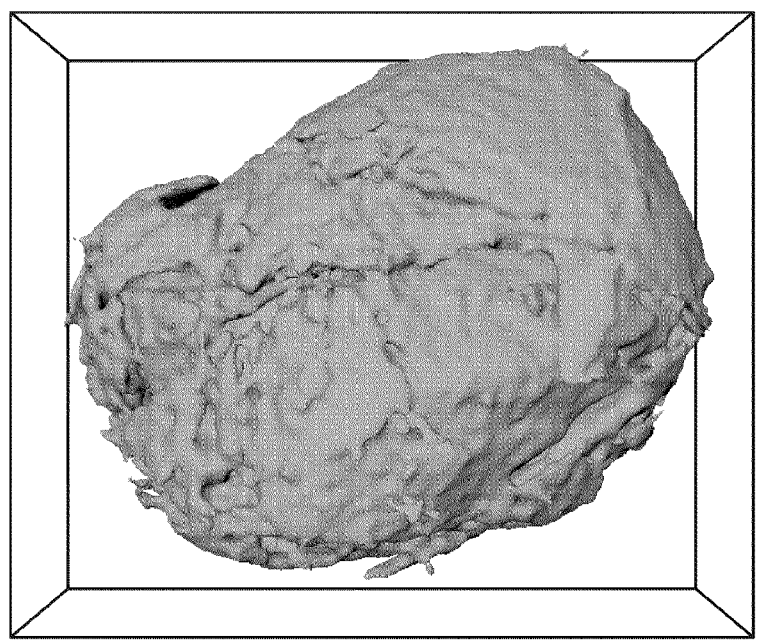
FIG. 1C is a three-dimensional image of the spherical particle observed from a different angle from FIGS. 1A and 1B.
Figure 1D:
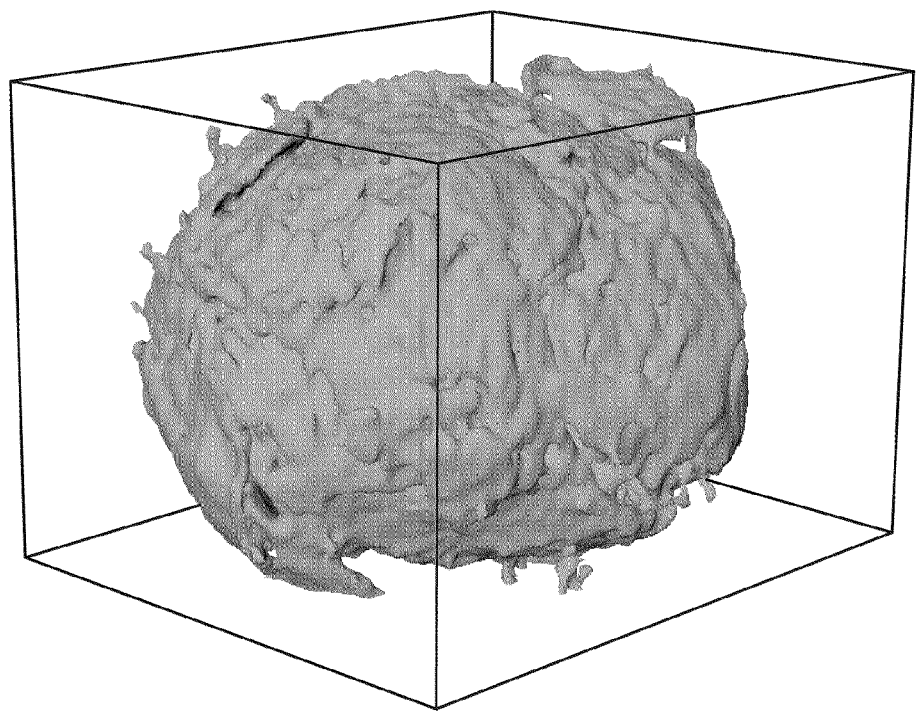
FIG. 1D is a three-dimensional image of the spherical particle observed from a different angle from FIGS. 1A, 1B, and 1C.
Figure 2A:
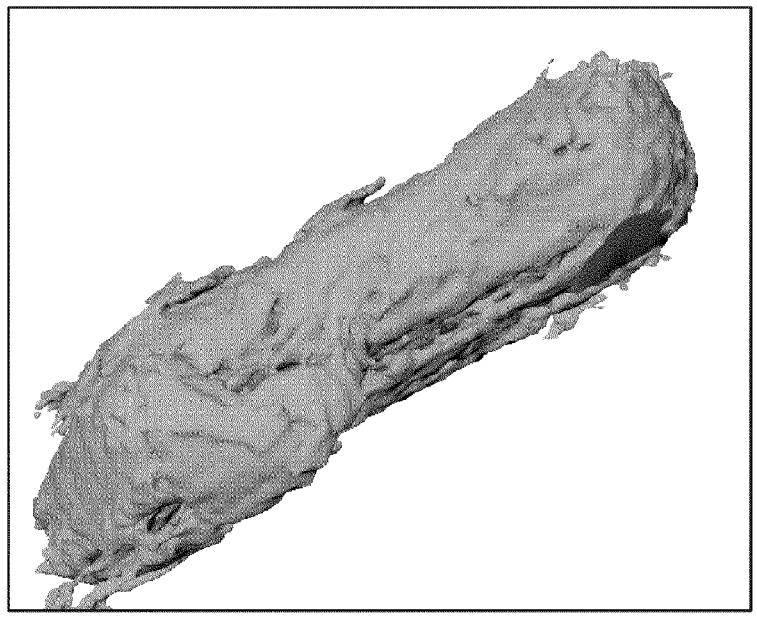
FIG. 2A is a three-dimensional image of a rod-shaped particle.
Figure 2B:
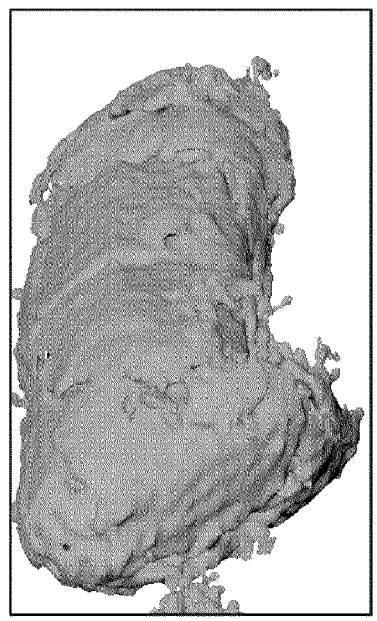
FIG. 2B is a three-dimensional image of the rod-shaped particle observed from a different angle from FIG. 2A.
Figure 2C:
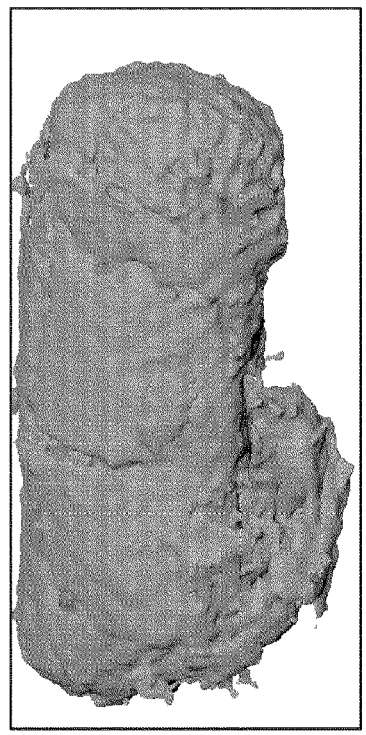
FIG. 2C is a three-dimensional image of the rod-shaped particle observed from a different angle from FIGS. 2A and 2B.
Figure 2D:
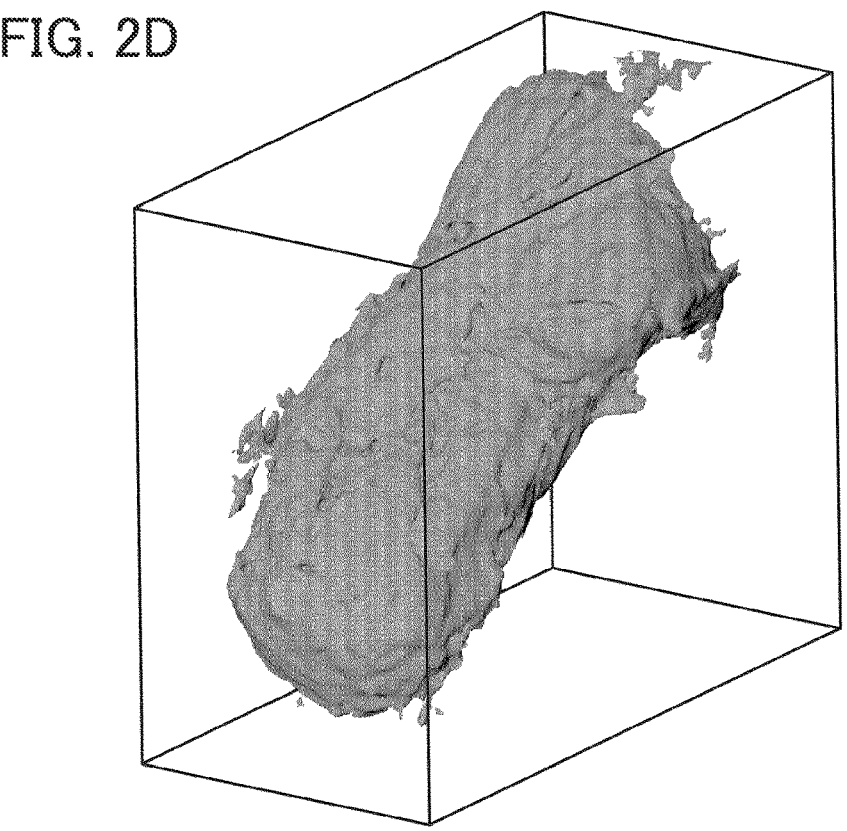
FIG. 2D is a three-dimensional image of the rod-shaped particle observed from a different angle from FIGS. 2A, 2B, and 2C.
Figure 3A:
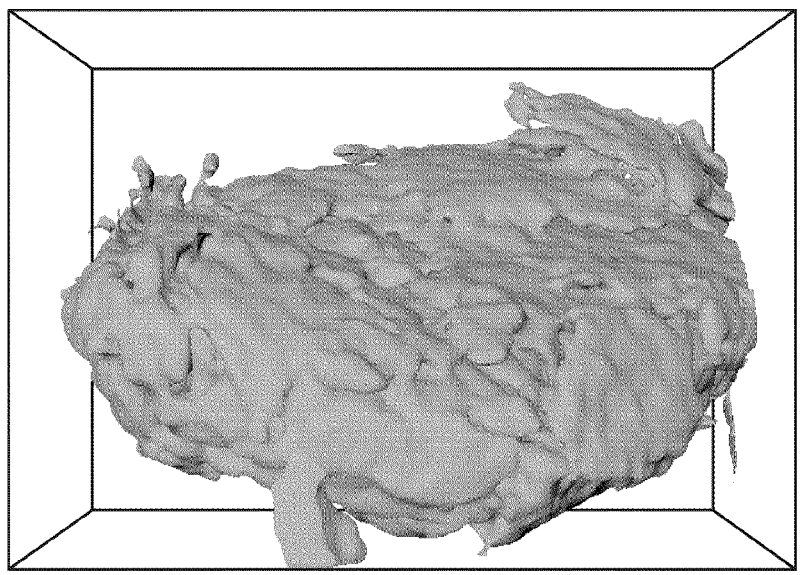
FIG. 3A is a three-dimensional image of another secondary particle.
Figure 3B:
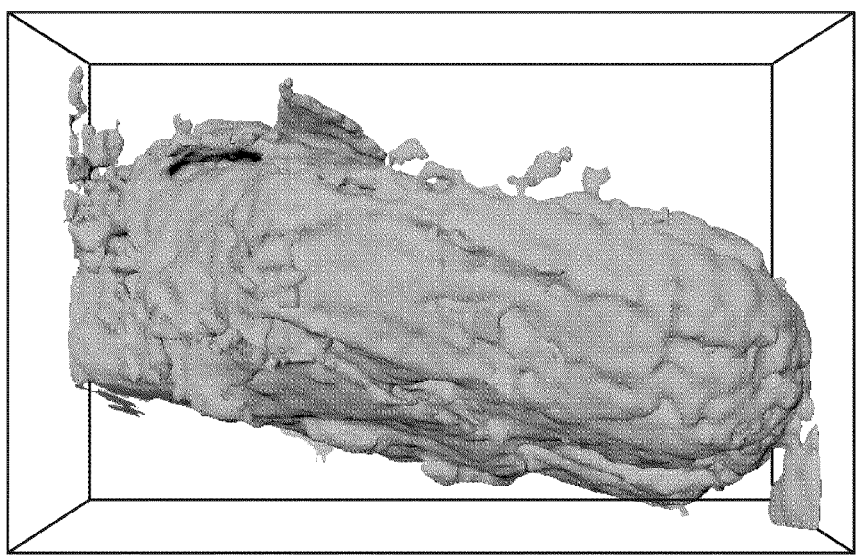
FIG. 3B is a three-dimensional image of the other secondary particle observed from a different angle from FIG. 3A.
Figure 3C:
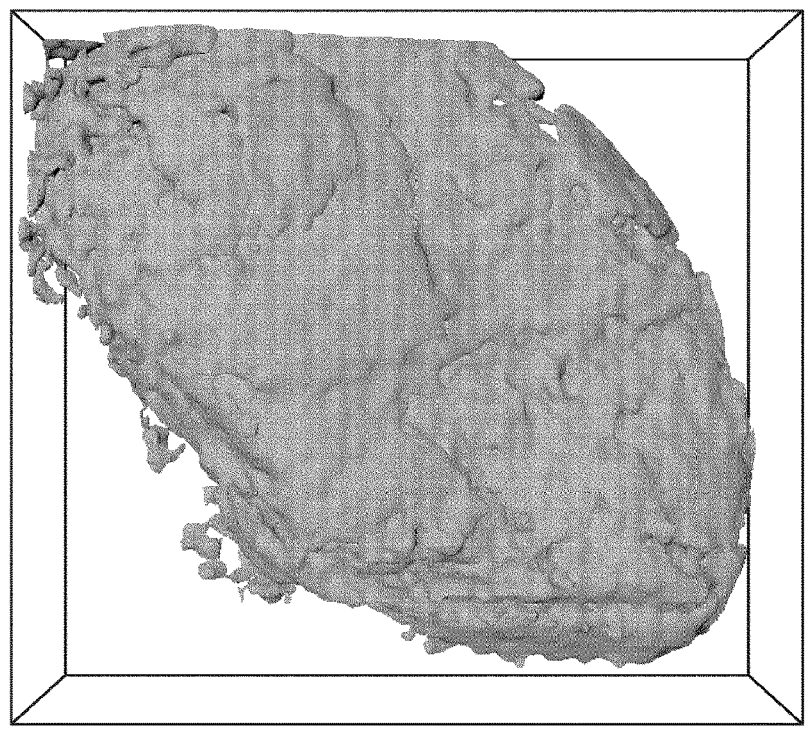
FIG. 3C is a three-dimensional image of the other secondary particle observed from a different angle from FIGS. 3A and 3B.
Figure 3D:
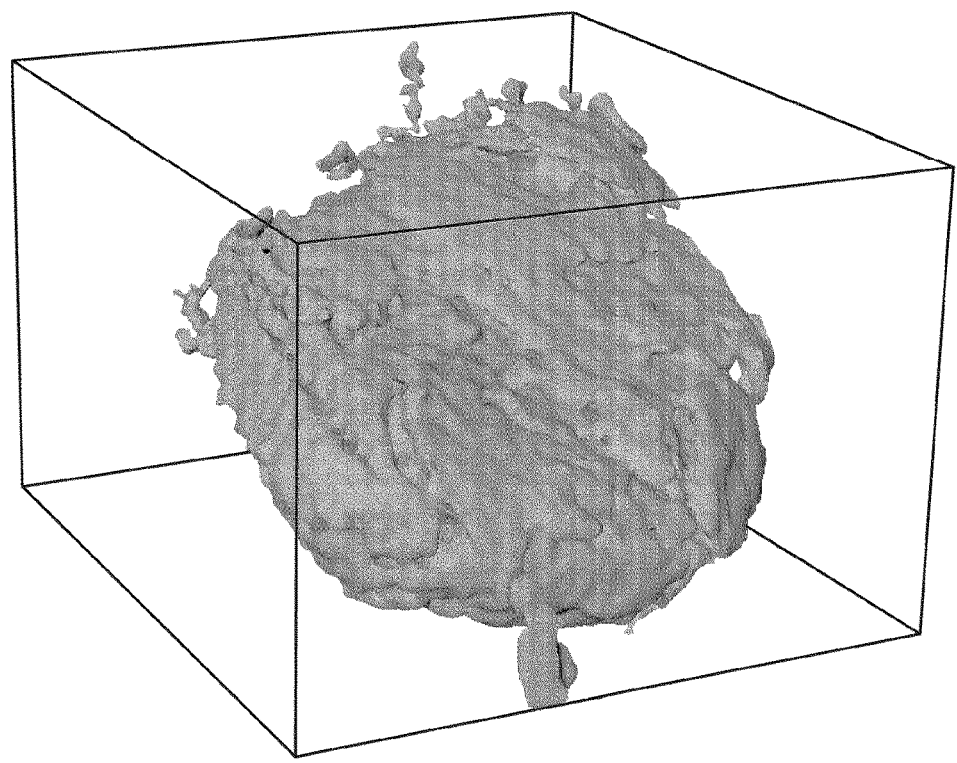
FIG. 3D is a three-dimensional image of the other secondary particle observed from a different angle from FIGS. 3A, 3B, and 3C.

The spherically-shaped coated graphite according to aspects of the invention contains spherically-shaped graphite having, in the particle size distribution of the primary particles that is obtained using X-ray computed tomography, a volume ratio of primary particles with an equivalent spherical diameter of not more than 0.8 μm (hereinafter, also called "fine grains") of more than 40.0% and not more than 70.0%, and a volume ratio of primary particles with an equivalent spherical diameter of not less than 1.5 μm and not more than 3.0 μm (hereinafter, also called "coarse grains") of not less than 3.0% and not more than 17.0%, and a carbonaceous substance covering the spherically-shaped graphite.

In addition, in the spherically-shaped coated graphite according to aspects of the invention, a pore volume of pores with a pore size of not less than 7.8 nm and not more than 36.0 nm is not more than 0.017 $cm^3/g$, and a mass of infiltrated dibutyl phthalate is less than 0.70 $g/cm^3$.

When the spherically-shaped coated graphite according to aspects of the invention is used as a negative electrode material for a lithium ion secondary battery, a decrease in cycle capacity is reduced (cycle capacity-maintaining property is excellent). This is presumably because, for example, expansion and shrinkage of spherically-shaped graphite are suppressed when the fine grains and the coarse grains have the foregoing ratios.

In addition, when the pore volume and the mass of infiltrated dibutyl phthalate fall within the foregoing ranges, cycle capacity-maintaining property is excellent because of the reason described later.

<Spherically-Shaped Graphite>

Spherically-shaped graphite contained in the spherically-shaped coated graphite according to aspects of the invention (hereinafter, also referred to as "spherically-shaped graphite according to aspects of the invention" for convenience) is described.

<<Fine Grains and Coarse Grains>>

As described above, in the spherically-shaped graphite according to aspects of the invention, the fine grains have the volume ratio of more than 40.0% and not more than 70.0%, and the coarse grains have the volume ratio of not less than 3.0% and not more than 17.0%.

Because cycle capacity-maintaining property is more excellent, the volume ratio of the fine grains is preferably not less than 40.1%, and more preferably not less than 40.2%.

Meanwhile, the volume ratio of the fine grains is preferably not more than 60.0%, more preferably not more than 50.0%, further preferably not more than 45.0%, and particularly preferably not more than 43.0%.

Because cycle capacity-maintaining property is more excellent, the volume ratio of the coarse grains is preferably not more than 16.8%, more preferably not more than 16.5%, and further preferably not more than 16.2%.

Meanwhile, the volume ratio of the coarse grains is preferably not less than 3.5%, more preferably not less than 5.0%, further preferably not less than 7.0%, and particularly preferably not less than 7.5%.

(Particle Size Distribution of Primary Particles)

A method of obtaining a particle size distribution of the primary particles constituting the spherically-shaped graphite is described.

In order to find sizes of the primary particles, it is necessary to visualize the spherically-shaped graphite with a high resolution in a non-destructive manner. Hence, the spherically-shaped graphite is observed with X-ray computed tomography using a radiation source. More specifically, imaging X-ray computed tomography is performed using SPring-8 beamline (BL24XU) under the following conditions.

X-ray energy: 8 keV
Image resolution: 1,248 (H)×2,048 (W) pixels
Effective pixel size: 68 nm/pixel
Exposure time: 0.5 seconds
Number of captured projection images: 1,200
Defocus: 0.3 mm The spherically-shaped graphite as a sample is charged into a quartz glass capillary (inner diameter: about 0.1 mm) and subjected to X-ray computed tomography.

After projection images of the spherically-shaped graphite are captured, a cross-sectional slice image is reconstructed. Subsequently, a watershed analysis function of a commercial image analysis software, ExFact VR (available from Nihon Visual Science, Inc.) is used to separate and individually recognize neighboring primary particles, and a volume of each primary particle is calculated. In addition, an equivalent spherical diameter of each primary particle is determined from the obtained volume. Data of each primary particle is plotted in a graph (horizontal axis: equivalent spherical diameter, vertical axis: volume ratio of each primary particle with respect to total volume), whereby the particle size distribution of the primary particles is obtained.

<<Spherical Shape and Rod Shape>>

Because cycle capacity-maintaining property is more excellent, the spherically-shaped graphite according to aspects of the invention preferably has, in a particle shape distribution of secondary particles that is obtained using X-ray computed tomography, a volume ratio of secondary particles in spherical shape (hereinafter, also called "spherical particles") of not less than 3.0% and not more than 26.0%, and a volume ratio of secondary particles in rod shape (hereinafter, also called "rod-shaped particles") of not less than 20.0% and not more than 70.0%.

Because cycle capacity-maintaining property is further excellent, the volume ratio of the spherical particles is more preferably not more than 25.8%, further preferably not more than 25.5%, and particularly preferably not more than 25.2%.

Meanwhile, the volume ratio of the spherical particles is more preferably not less than 3.5%, further preferably not less than 5.0%, particularly preferably not less than 7.0%, and most preferably not less than 7.5%.

Because cycle capacity-maintaining property is further excellent, the volume ratio of the rod-shaped particles is more preferably not less than 20.5%, further preferably not less than 21.0%, and particularly preferably not less than 21.5%.

Meanwhile, the volume ratio of the rod-shaped particles is more preferably not more than 65.0%, further preferably not more than 60.0%, particularly preferably not more than 50.0%, and most preferably not more than 40.0%.

(Particle Shape Distribution of Secondary Particles)

A method of obtaining a particle shape distribution of the secondary particles constituting the spherically-shaped graphite is described.

In order to find shapes of the secondary particles, it is necessary to visualize the spherically-shaped graphite with a high resolution in a non-destructive manner. Hence, the spherically-shaped graphite is observed with X-ray computed tomography using a radiation source. More specifically, projection X-ray computed tomography is performed using SPring-8 beamline (BL24XU) under the following conditions.

X-ray energy: 20 keV
Image resolution: 2048 (H)×2,048 (W) pixels
Effective pixel size: 325 nm/pixel
Exposure time: 0.1 seconds
Number of captured projection images: 1800
Distance between sample and detector: 10 mm The spherically-shaped graphite as a sample is charged into a borosilicate glass capillary (inner diameter: about 0.6 mm) and subjected to X-ray computed tomography.

After projection images of the spherically-shaped graphite are captured, a cross-sectional slice image is reconstructed. Subsequently, a watershed analysis function of a commercial image analysis software, ExFact VR (available from Nihon Visual Science, Inc.) is used to separate and individually recognize neighboring secondary particles, and a volume of each secondary particle is calculated.

Next, for each secondary particle, three principal axes of inertia mutually perpendicular to one another are defined, and a barycentric moment of each of the axes is obtained. Among the three barycentric moments, the largest moment is determined as L, the smallest moment as S, and the intermediate moment as M. According to the following definitions, particle shapes of respective secondary particles are classified as the spherical shape, rod shape, and another shape.

Spherical shape: $S/L \geq 0.5$, and $M/L \geq 0.5$
Rod shape: $S/L < 0.5$, and $M/L < 0.5$ With respect to a total volume of secondary particles, a volume ratio of secondary particles classified as the spherical shape (spherical particles) and a volume ratio of secondary particles classified as the rod shape (rod-shaped particles) are determined. Accordingly, the shape distribution of the secondary particles is obtained.

Examples of three-dimensional images obtained by image analysis of the X-ray computed tomographic data of the secondary particles are shown.

FIGS. 1A to 1D are three-dimensional images of a spherical particle ($S/L=0.79$, $M/L=0.91$).

FIGS. 2A to 2D are three-dimensional images of a rod-shaped particle ($S/L=0.11$, $M/L=0.19$).

FIGS. 3A to 3D are three-dimensional images of another secondary particle (ellipsoidal particle) ($S/L=0.22$, $M/L=0.88$).

In FIGS. 1A to 1D, a single secondary particle is observed at different observation angles. The same applies to FIGS. 2A to 2D and FIGS. 3A to 3D.

<<Average Secondary Particle Diameter>>

The spherically-shaped graphite according to aspects of the invention preferably has an average secondary particle diameter (also simply called "average particle diameter") of preferably not less than 5.0 μm and more preferably not less than 6.5 μm.

Meanwhile, the average particle diameter of the spherically-shaped graphite according to aspects of the invention is preferably not more than 15.0 μm, and more preferably not more than 12.0 μm.

The average particle diameter is a particle diameter with which a cumulative frequency of a particle size distribution obtained by a laser diffraction type particle size distribution analyzer (LMS2000e, manufactured by Seishin Enterprise Co., Ltd.) becomes 50% by volume.

<<Specific Surface Area>>

The spherically-shaped graphite according to aspects of the invention has a specific surface area of preferably not less than 5.0 m$^2$/g, and more preferably not less than 7.0 m$^2$/g.

Meanwhile, the specific surface area of the spherically-shaped graphite according to aspects of the invention is preferably not more than 15.0 m$^2$/g, and more preferably not more than 13.0 m$^2$/g.

The specific surface area is a BET specific surface area determined according to JIS Z 8830:2013 "Determination of the specific surface area of powders (solids) by gas adsorption." Specifically, a sample is preliminarily dried at 50° C., followed by flowing nitrogen gas for 30 minutes, and thereafter the single-point BET method is performed through nitrogen gas adsorption using MONOSORB (manufactured by Quantachrome Instruments Japan G.K.), whereby the specific surface area is determined.

<<Production Method of Spherically-Shaped Graphite>>

A suitable method for producing the spherically-shaped graphite according to aspects of the invention is a method in which a raw material is processed into a spherical shape (spherically shaped) and then subjected to heat treatment.

(Spherically Shaping)

The raw material is graphite having a different shape from a spherical shape (including ellipsoidal shape), such as flake graphite. The graphite may be either of natural graphite and artificial graphite, while natural graphite is preferred because of high crystallinity or other reasons.

More specifically, exemplified are a method in which the raw material is mixed in the presence of a granulation assisting agent such as an adhesive or a resin, a method in which a mechanical external force is applied to raw materials without use of a granulation assisting agent, and a method in which the both methods are combined.

Among these, the method in which a mechanical external force is applied to raw materials without use of a granulation assisting agent is preferred. This method is described below in more detail.

More specifically, a raw material (such as flake graphite) is pulverized and granulated with a pulverizing apparatus by which a mechanical external force is applied to the raw material. Accordingly, the raw material is spherically shaped.

Examples of a pulverizing apparatus include a rotating ball mill, Opposed Jet Mill (manufactured by Hosokawa Micron Corporation), Current Jet (manufactured by Nisshin Engineering Inc.), Hybridization System (manufactured by Nara Machinery Co., Ltd.), CF mill (manufactured by UBE Corporation), MECHANO FUSION System (manufactured by Hosokawa Micron Corporation), and Theta Composer (manufactured by TOKUJU CORPORATION), and among these, Hybridization System (manufactured by Nara Machinery Co., Ltd.) is preferred.

In accordance with aspects of the invention, it is preferable that while a plurality of pulverizing apparatuses are installed in series, a raw material sequentially passes through the pulverizing apparatuses. In other words, the pulverizing apparatuses are preferably installed in series such that immediately after a raw material has passed through one of the pulverizing apparatuses, the raw material is pulverized and granulated in the next pulverizing apparatus.

Here, the number of pulverizing apparatuses is, for example, 1 or more, preferably 2 or more, and more preferably 3 or more.

Meanwhile, the number of pulverizing apparatuses is preferably 10 or less, more preferably 7 or less, and further preferably 5 or less.

Time for pulverizing and granulating the raw material (also called "pulverizing time" for convenience) in each pulverizing apparatus is preferably not less than 1 minute/apparatus, more preferably not less than 3 minutes/apparatus, and further preferably not less than 5 minutes/apparatus.

Meanwhile, the pulverizing time in each pulverizing apparatus is preferably not more than 60 minutes/apparatus, more preferably not more than 50 minutes/apparatus, and further preferably not more than 40 minutes/apparatus.

A product of the number of pulverizing apparatuses and the pulverizing time in each pulverizing apparatus (also called "total pulverizing time" for convenience) is preferably not less than 10 minutes, more preferably not less than 15 minutes, and further preferably not less than 20 minutes.

Meanwhile, the total pulverizing time is preferably not more than 180 minutes, and more preferably not more than 160 minutes.

The pulverizing apparatus normally includes a rotor built therein.

The rotor in each pulverizing apparatus has a circumferential speed of preferably not more than 60 m/second, more preferably not more than 50 m/second, and further preferably not more than 40 m/second.

Meanwhile, the circumferential speed of the rotor in each pulverizing apparatus is preferably not less than 5 m/second, more preferably not less than 10 m/second, and further preferably not less than 20 m/second.

A product (unit: m) of the total pulverizing time (unit: second) and the circumferential speed of the rotor (unit: m/second) is preferably not less than 10,000 m, more preferably not less than 20,000 m, and further preferably not less than 30,000 m.

Meanwhile, the product is preferably not more than 600,000 m, more preferably not more than 550,000 m, and further preferably not more than 500,000 m.

An amount of the raw material charged into each pulverizing apparatus is preferably smaller for easier application of a sheer fore and a compression force to the raw material.

(Heat Treatment)

Next, the spherically-shaped raw material is subjected to heat treatment. The spherically-shaped graphite is obtained in this manner.

As described later, when the spherically-shaped graphite has functional groups remaining on the surface thereof, an aggregation is easily generated, and cycle capacity-maintaining property is likely to decrease. Accordingly, in order to reduce functional groups on the surface of the obtained spherically-shaped graphite to achieve good cycle capacity-maintaining property, heat treatment is performed.

The atmosphere for performing heat treatment is preferably a non-oxidizing atmosphere such as an argon atmosphere, a helium atmosphere, or a nitrogen atmosphere.

The temperature for performing heat treatment (heat treatment temperature) is preferably not lower than 300° C., more preferably not lower than 400° C., and further preferably not lower than 500° C. Meanwhile, the heat treatment temperature is preferably not higher than 860° C., more preferably not higher than 800° C., further preferably not higher than 700° C., and particularly preferably not higher than 600° C.

The time for performing heat treatment (heat treatment time) is preferably not less than 0.5 hours, more preferably not less than 1 hour, and more preferably not less than 1.5 hours. Meanwhile, the heat treatment time is preferably not more than 5 hours, more preferably not more than 4 hours, and further preferably not more than 3 hours.

When the heat treatment temperature is too low, or when the heat treatment time is too short, functional groups may remain on the surface of the obtained spherically-shaped graphite in some cases.

When the heat treatment temperature is too high, or when the heat treatment time is too long, functional groups on the surface of the obtained spherically-shaped graphite may be excessively reduced in some cases. In this case, a carbonaceous substance covering the surface of the spherically-shaped graphite to be described later easily peels off.

Examples of a furnace used for heat treatment include a butch furnace, a rotary kiln, and a roller-hearth kiln, and a rotary kiln is preferred from the viewpoint of productivity.

As long as functional groups on the surface of the obtained spherically-shaped graphite can be reduced, another method may be adopted, and plural methods may be used in combination.

<Carbonaceous Substance>

The spherically-shaped coated graphite according to aspects of the invention contains a carbonaceous substance covering the spherically-shaped graphite according to aspects of the invention.

The carbonaceous substance is obtained by, for example, baking a carbonaceous precursor to be described later.

<<Carbonaceous Substance Content>>

A carbonaceous substance content in the spherically-shaped coated graphite according to aspects of the invention is preferably not less than 1.0 mass %, more preferably not less than 3.0 mass %, further preferably not less than 8.0 mass %, and particularly preferably not less than 10.0 mass %.

With the carbonaceous substance content within this range, an active edge surface of spherically-shaped graphite is easily covered, and the initial charging-discharging efficiency is excellent.

Meanwhile, the carbonaceous substance content in the spherically-shaped graphite according to aspects of the invention is preferably not more than 30.0 mass %, more preferably not more than 25.0 mass %, further preferably not more than 20.0 mass %, and particularly preferably not more than 15.0 mass %.

With the carbonaceous substance content within this range, an amount of carbonaceous substance whose discharging capacity is relatively low is small, and the discharging capacity is excellent.

In addition, with the carbonaceous substance content within this range, an amount of used carbonaceous precursor described later is small, leading to less occurrence of fusion during the processes of mixing and baking described later and suppressing breakage and peeling of the finally obtained carbonaceous substance, whereby the initial charging-discharging efficiency is excellent.

To meet the carbonaceous substance content, the average value of the carbonaceous substance content in the entire spherically-shaped coated graphite should fall within the foregoing range. It is not necessary that every particle of the spherically-shaped coated graphite has the carbonaceous substance content within the foregoing range, and spherically-shaped coated graphite particles having the carbonaceous substance content falling outside the foregoing range may be partly included.

The carbonaceous substance content is determined from an amount of residual carbon in the carbon precursor which has been alone baked under the same conditions as those for a process of baking a mixture of the spherically-shaped graphite and the carbonaceous precursor.

<Pore Volume>

As an index correlating with a resistivity of the spherically-shaped coated graphite in association with absorption/storage and release of lithium, the inventors of the present invention focused on the pore volume determined from the nitrogen adsorption isotherm through the density functional theory (DFT) method.

Besides, the inventors discovered that the pore volume of pores with a pore size of less than 7.8 nm is derived from amorphous carbon and is not likely to contribute to the resistivity in association with absorption/storage and release of lithium. Furthermore, the inventors found out that the pore volume of pores with a pore size of not less than 7.8 and not more than 36.0 nm serves as a good index correlating with the resistivity, and eventually with cycle capacity-maintaining property.

Specifically, because cycle capacity-maintaining property is excellent, the spherically-shaped coated graphite according to aspects of the invention has the pore volume of pores with a pore size of not less than 7.8 and not more than 36.0 nm (hereinbelow, also called "pore volume V" for convenience) of not more than $0.017$ $cm^3/g$.

The lower limit of the pore volume V is not particularly limited and is, for example, $0.005$ $cm^3/g$, preferably $0.008$ $cm^3/g$, more preferably $0.010$ $cm^3/g$, and further preferably $0.012$ $cm^3/g$.

In the spherically-shaped coated graphite according to aspects of the invention, the pore volume of pores with a pore size of not more than 2.0 nm is preferably $1.0 \times 10^{-2}$ to $2.0 \times 10^{-2}$ $cm^3/g$.

The pore volume is measured through the DFT method according to JIS Z 8831-2 (Analysis of mesopores and macropores by gas adsorption) and JIS Z 8831-3 (Analysis of micropores by gas adsorption). The pore volume measurement is started from a relative pressure of $5 \times 10^{-2}$ Pa.

<Mass of Infiltrated Dibutyl Phthalate>

The inventors hypothesized that an aggregation of spherically-shaped coated graphite is one of the obstructive factors obstructing an improvement in cycle capacity-maintaining property. More specifically, the inventors hypothesized as described below.

That is, when functional groups remain on the surface of spherically-shaped graphite, a carbonaceous substance coating is uneven, and an aggregation is easily generated. At a site where an aggregation is present, the spherically-shaped graphite has larger expansion and shrinkage, and cycle capacity-maintaining property is likely to decrease.

While presence of an aggregation of spherically-shaped coated graphite can be observed using, for example, a microscope, it is difficult to quantitatively show a size and a ratio thereof.

Accordingly, using, as an index, dibutyl phthalate (DBP) that is used to quantitate the structure of carbon black or other fine particles, the inventors evaluated the state of aggregations by the following method using a column.

In a case where spherically-shaped coated graphite is charged into a column and has many aggregations, it is expected that a large number of gaps are formed, resulting in the increased mass of infiltrated dibutyl phthalate. Therefore, from the viewpoint of achieving the better cycle capacity-maintaining property, it is preferable to have a small mass of infiltrated dibutyl phthalate.

Specifically, the spherically-shaped coated graphite according to aspects of the invention has the mass of infiltrated dibutyl phthalate of less than $0.70$ $g/cm^3$, preferably of not more than $0.69$ $g/cm^3$, and more preferably of not more than $0.66$ $g/cm^3$.

In a case where spherically-shaped coated graphite in the column cannot maintain its shape and turns into, for example, a laminate of flake graphite, the mass of infiltrated dibutyl phthalate becomes small, and cycle capacity-maintaining property may sometimes decrease.

Hence, because cycle capacity-maintaining property is more excellent, the mass of infiltrated dibutyl phthalate of the spherically-shaped coated graphite according to aspects of the invention is preferably not less than $0.40$ $g/cm^3$, and more preferably not less than $0.50$ $g/cm^3$.

The mass of infiltrated dibutyl phthalate is measured at room temperature using a dynamic solderability tester (6200TN, manufactured by Rhesca Co., Ltd.).

Specifically, 1.00 g of powdery spherically-shaped coated graphite is taken and charged into a glass tube called a column, and one end of the column is covered by a nylon mesh lid which is fixed with a fixing ring. Following the charging, the column is tapped such that the powder in the column has a height of 15 mm (charged volume: approximately 1.18 $cm^3$).

Subsequently, dibutyl phthalate is put into a pot part of the tester, and the column into which the spherically-shaped coated graphite was charged is placed near the lower end of the pot part of the tester. The pot part is elevated toward the lower end of the column so that the lower end of the column is brought into contact with liquid dibutyl phthalate. When contacting, the powder absorbs the liquid; after a lapse of 600 seconds, the column is taken out, and an increase in the mass is measured. A value obtained by dividing the increased mass by the charged volume is regarded as the mass of infiltrated dibutyl phthalate (unit: $g/cm^3$).

The above-described operation is repeated five times, and the average value of the five operations is regarded as the mass of infiltrated dibutyl phthalate of the spherically-shaped coated graphite.

<Average Secondary Particle Diameter>

The spherically-shaped coated graphite of the invention has an average secondary particle diameter (average particle diameter) of preferably not less than 5.0 μm, more preferably not less than 6.5 μm, and further preferably not less than 8.0 μm.

Meanwhile, the average particle diameter of the spherically-shaped coated graphite according to aspects of the invention is preferably not more than 15.0 μm, more preferably not more than 13.5 μm, and further preferably not more than 12.0 μm.

<Specific Surface Area>

The spherically-shaped coated graphite according to aspects of the invention has a specific surface area of preferably not less than $0.5$ $m^2/g$, more preferably not less than $1.0$ $m^2/g$, and further preferably not less than $3.5$ $m^2/g$.

Meanwhile, the specific surface area of the spherically-shaped coated graphite according to aspects of the invention is preferably not more than $10.0$ $m^2/g$, more preferably not more than $7.5$ $m^2/g$, and further preferably not more than $6.0$ $m^2/g$.

[Production Method of Spherically-Shaped Coated Graphite]

The method of producing the spherically-shaped coated graphite according to aspects of the invention is not particularly limited, and a suitable example thereof is a method in which a carbonaceous precursor is added to and mixed with the spherically-shaped graphite according to aspects of the invention as a core material, and thereafter the mixture is baked. According to this method, the carbonaceous precursor forms a carbonaceous substance that covers the core material (spherically-shaped graphite) through mixing and baking. In other words, the spherically-shaped coated graphite is obtained.

This method is described below in detail.

<Carbonaceous Precursor>

The carbonaceous precursor is exemplified by a tar-pitch and/or a resin being a carbon material that has low crystallinity compared to graphite and thus would never form a graphite crystal even when subjected to high temperature treatment necessary for graphitization.

Examples of the tar-pitch include coal-tar, tar light oil, tar middle oil, tar heavy oil, naphthalene oil, anthracene oil, coal-tar pitch, pitch oil, mesophase pitch, oxygen-bridged oil pitch, and heavy oil.

Examples of the resin include thermoplastic resins such as a polyvinyl alcohol, and a polyacrylic acid, and thermosetting resins such as a phenolic resin, and a furan resin.

In terms of cost, the carbonaceous precursor preferably comprises a tar-pitch only, being free of resins. A suitable example of the foregoing carbonaceous precursor is a carbonaceous precursor including not less than 80 mass % of coal-tar pitch.

<Mixing>

The core material (spherically-shaped graphite) and the carbonaceous precursor are mixed. It is preferable to have a mixing ratio that results in the above-described carbonaceous substance content of the spherically-shaped coated graphite finally obtained.

The mixing method is not particularly limited as long as uniform mixing is achieved, and a known mixing method is adopted. An example thereof is a method in which heat mixing is performed using, for instance, a biaxial kneader having a heating mechanism such as a heater or a heat medium.

The atmosphere for the mixing is not particularly limited and is, for example, an air atmosphere.

The temperature for the mixing (mixing temperature) is preferably not lower than 5° C., more preferably not lower than 10° C., and further preferably not lower than 25° C. Meanwhile, the mixing temperature is preferably not higher than 150° C., more preferably not higher than 100° C., and further preferably not higher than 60° C.

<Baking>

The mixture obtained by the foregoing mixing is baked.

While the baking method is not particularly limited, it is preferable that the mixture is baked in an inert atmosphere in order to prevent oxidation during the baking. In this process, a tubular furnace is preferably used.

The atmosphere for the baking is a non-oxidizing atmosphere, and examples thereof include an argon atmosphere, a helium atmosphere, and a nitrogen atmosphere.

The temperature for the baking (baking temperature) is preferably not lower than 700° C., and more preferably not lower than 900° C. Meanwhile, the baking temperature is preferably not higher than 2,000° C., more preferably not higher than 1,300° C., and further preferably not higher than 1,200° C.

Specifically, the baking is preferably performed at a temperature of 700° C. to 2,000° C. under a nitrogen stream, for example.

The baking time is preferably not less than 5 minutes. Meanwhile, the baking time is preferably not more than 30 hours.

The temperature elevation until the baking temperature is reached can be a linear temperature elevation, a step-wise temperature elevation in which the temperature is held at constant intervals, or any of other various types of temperature elevation.

In accordance with aspects of the present invention, it is preferable that pulverizing process is not performed after the baking.

In addition, prior to the baking, a different kind of graphite material may be attached to, embedded in, or combined with the core material (spherically-shaped graphite). Examples of the different kind of graphite include carbonaceous or graphite fibers, a carbonaceous precursor material such as an amorphous hard carbon, an organic material, and an inorganic material.

Hereinafter, the foregoing "spherically-shaped coated graphite according to aspects of the invention" may be referred to as "negative electrode material according to aspects of the invention."

[Negative Electrode for Lithium Ion Secondary Battery (Negative Electrode)]

A negative electrode for a lithium ion secondary battery according to aspects of the invention is a negative electrode for a lithium ion secondary battery containing the negative electrode material according to aspects of the invention. The negative electrode for a lithium ion secondary battery is also simply referred to as "negative electrode."

The negative electrode according to aspects of the invention is prepared as with a normal negative electrode.

For preparation of the negative electrode, it is preferable to use a negative electrode mixture preliminarily prepared by adding a binder to the negative electrode material according to aspects of the invention. The negative electrode mixture may contain an active material or an electrically conductive material in addition to the negative electrode material according to aspects of the invention.

It is preferable that the binder is chemically and electrochemically stable against an electrolyte, and for the binder, use may be made of, for example, fluororesin such as polytetrafluoroethylene or polyvinylidene fluoride; resin such as polyethylene, polyvinyl alcohol, or styrene butadiene rubber; and carboxymethyl cellulose, while two or more of these can be used in combination.

The binder normally accounts for about 1 to 20 mass % of the total amount of the negative electrode mixture.

More specifically, first, the negative electrode material according to aspects of the invention is optionally adjusted to a desired particle size through classification or the like. Thereafter, the negative electrode material according to aspects of the invention is mixed with the binder, and the resulting mixture is dispersed in a solvent to prepare the negative electrode mixture in a paste form. Examples of the solvent include water, isopropyl alcohol, N-methylpyrrolidone, and dimethylformamide. In the mixing and dispersing processes, a known agitator, mixer, kneader or the like is used.

The prepared paste is applied on one or both of the surfaces of a current collector and dried. This process results in a negative electrode mixture layer (negative electrode) that is uniformly and firmly adhered to the current collector.

The negative electrode mixture layer has a thickness of preferably 10 to 200 μm and more preferably 20 to 100 μm.

After the negative electrode mixture layer is formed, compression bonding such as press pressurization is performed, whereby the adhesion strength of the negative electrode mixture layer (negative electrode) to the current collector can be further improved.

The shape of the current collector is not particularly limited, and examples thereof include a foil-like shape, a mesh shape, and a net-like shape such as an expanded metal shape. The material of the current collector is preferably copper, stainless steel, nickel or the like. The current collector preferably has a thickness of about 5 to 20 μm in a case of a foil-like shape.

<Degree of Orientation>

The negative electrode according to aspects of the invention preferably has a suppressed orientation of graphite, while having high density. The degree of orientation of the negative electrode is quantitatively rated through X-ray diffraction. The method therefor is described below.

First, a negative electrode punched out into a disc shape of 2 cm$^2$ (density: 1.20 g/cm$^3$) is attached on a glass plate with the negative electrode facing upward. When an X-ray is emitted to the thus prepared sample and diffracted, a plurality of diffraction peaks corresponding to crystal planes of graphite appear. A ratio ($I_{004}/I_{110}$) between a peak intensity $I_{004}$ near 2θ=54.6 degree derived from the plane (004) and a peak intensity $I_{110}$ near 2θ=77.4 degree derived from the plane (110) among the diffraction peaks is regarded as a degree of orientation of the negative electrode.

When the density is 1.20 g/cm$^3$, the degree of orientation ($I_{004}/I_{110}$) of the negative electrode according to aspects of the invention is preferably not less than 2.0, more preferably not less than 3.0, and further preferably not less than 4.0.

[Lithium Ion Secondary Battery]

A lithium ion secondary battery according to aspects of the invention is a lithium ion secondary battery including the negative electrode according to aspects of the invention.

The lithium ion secondary battery according to aspects of the invention includes components such as a positive electrode and a non-aqueous electrolyte in addition to the negative electrode according to aspects of the invention. The lithium ion secondary battery according to aspects of the invention is composed of, for example, the negative electrode, a non-aqueous electrolyte, and a positive electrode superposed in this order and accommodated in an exterior material of the battery.

The type of the lithium ion secondary battery according to aspects of the invention can be arbitrarily selected from a cylindrical type, a square type, a coin type, a button type and other types, depending on the intended use, the device to which the battery is to be mounted, the required charging-discharging capacity, or the like.

<Positive Electrode>

For a material of the positive electrode (positive electrode active material), a material that can absorb and store as well as release lithium in a sufficient amount is preferably selected. Examples of a positive electrode active material include, in addition to lithium, a lithium-containing compound such as a lithium-containing transition metal oxide, a transition metal chalcogenide, a vanadium oxide or a lithium compound thereof; a Chevrel phase compound expressed by Formula $M_xMo_6S_{8-Y}$ (where M represents at least one transition metal element, X is a numerical value in the range of 0≤X≤4, and Y is a numerical value in the range of 0≤Y≤1); activated carbon; and activated carbon fiber. The vanadium oxide is expressed by $V_2O_5$, $V_6O_{13}$, $V_2O_4$ or $V_3O_8$.

The lithium-containing transition metal oxide is a composite oxide of lithium and a transition metal, and lithium and two or more kinds of transition metals may be mixed to form a solid solution as the lithium-containing transition metal oxide. A single composite oxide may be used alone, or two or more composite oxides may be used in combination.

The lithium-containing transition metal oxide is specifically expressed by $LiM^1_{1-X}M^2_XO_2$ (where $M^1$ and $M^2$ represent at least one transition metal element, and X is a numerical value in the range of 0≤X≤1) or $LiM^1_{1-Y}M^2_YO_4$ (where $M^1$ and $M^2$ represent at least one transition metal element, and Y is a numerical value in the range of 0δX≤1).

The transition metal element represented by $M^1$ and $M^2$ may be Co, Ni, Mn, Cr, Ti, V, Fe, Zn, Al, In or Sn, with Co, Ni, Fe, Mn, Ti, Cr, V and Al being preferred. Preferred examples include $LiCoO_2$, $LiNiO_2$, $LiMnO_2$, $LiNi_{0.9}Co_{0.1}O_2$, and $LiNi_{0.5}Co_{0.5}O_2$.

Using, for example, lithium, an oxide of a transition metal, a hydroxide of a transition metal, and a salt of a transition metal as starting materials, the lithium-containing transition metal oxide is obtained by mixing the starting materials according to the composition of the desired metal oxide and baking the mixture in an oxygen atmosphere at temperature of 600 to 1,000° C.

As the positive electrode active material, any of the foregoing compounds may be used alone, or two or more thereof may be used in combination. For instance, a carbonate such as lithium carbonate can be added to the positive electrode. When the positive electrode is formed, various additives including an electrically conductive agent and a binder that are conventionally known can be suitably used.

The positive electrode is prepared by, for example, coating both surfaces of a current collector with a positive electrode mixture comprising a positive electrode active material, a binder, and an electrically conductive agent for imparting electrical conductivity to the positive electrode, thereby forming a positive electrode mixture layer.

As the binder, a binder used in preparation of a negative electrode can be used.

As the electrically conductive agent, a conventionally known electrically conductive agent such as a graphitized substance or carbon black is used.

The shape of the current collector is not particularly limited, and examples thereof include a foil-like shape and a net-like shape. The material of the current collector is aluminum, stainless steel, nickel or the like. The current collector preferably has a thickness of 10 to 40 μm.

As with the negative electrode, the positive electrode may be prepared by applying the positive electrode mixture in a paste form to the current collector, drying the applied positive electrode mixture, and performing compression bonding such as press pressurization.

<Non-Aqueous Electrolyte>

The non-aqueous electrolyte may be a liquid non-aqueous electrolyte (non-aqueous electrolytic solution), or a polyelectrolyte such as a solid electrolyte or a gel electrolyte.

In the former case, the non-aqueous electrolyte battery is structured as a so-called lithium ion secondary battery. In the latter case, the non-aqueous electrolyte battery is structured as a polymer electrolyte battery such as a solid polyelectrolyte battery or a gel polyelectrolyte battery.

As the non-aqueous electrolyte, use is made of a lithium salt which is an electrolyte salt used for an ordinary non-aqueous electrolytic solution, such as $LiPF_6$, $LiBF_4$, $LiAsF_6$, $LiClO_4$, $LiB(C_6H_5)$, $LiCl$, $LiBr$, $LiCF_3SO_3$, $LiCH_3SO_3$, $LiN(CF_3SO_2)_2$, $LiC(CF_3SO_2)_3$, $LiN(CF_3CH_2OSO_2)_2$, $LiN(CF_3CF_2OSO_2)_2$, $LiN(HCF_2CF_2CH_2OSO_2)_2$, LiN((CF$_3$)$_2$CHOSO$_2$)$_2$, LiB[{C$_6$H$_3$ (CF$_3$)$_2$}]$_4$, LiAlCl$_4$, or LiSiF$_6$. From the oxidative stability point of view, LiPF$_6$ and LiBF$_4$ are preferred.

The electrolyte salt concentration in the non-aqueous electrolytic solution is preferably 0.1 to 5.0 mol/L, and more preferably 0.5 to 3.0 mol/L.

Examples of a solvent used to prepare the non-aqueous electrolytic solution include a carbonate such as ethylene carbonate, propylene carbonate, dimethyl carbonate or diethyl carbonate; an ether such as 1,1- or 1,2-dimethoxyethane, 1,2-diethoxyethane, tetrahydrofuran, 2-methyltetrahydrofuran, γ-butyrolactone, 1,3-dioxolan, 4-methyl-1,3-dioxolan, anisole, or diethyl ether; a thioether such as sulfolane or methyl sulfolane; a nitrile such as acetonitrile, chloronitrile or propionitrile; and an aprotic organic solvent such as trimethyl borate, tetramethyl silicate, nitromethane, dimethylformamide, N-methylpyrolidone, ethyl acetate, trimethyl orthoformate, nitrobenzene, benzoyl chloride, benzoyl bromide, tetrahydrothiophene, dimethylsulfoxide, 3-methyl-2-oxazolidone, ethylene glycol, or dimethyl sulfite.

When a polyelectrolyte such as a solid electrolyte or a gel electrolyte is used for the non-aqueous electrolyte, a polymer gelated with a plasticizer (non-aqueous electrolytic solution) is preferably used as a matrix.

As a polymer constituting the matrix, use is suitably made of an ether-based polymer compound such as polyethylene oxide, or a crosslinked compound thereof; a poly(meth)acrylate-based polymer compound; or a fluorine-based polymer compound such as polyvinylidene fluoride, or vinylidene fluoride-hexafluoropropylene copolymer.

The non-aqueous electrolytic solution serving as a plasticizer has an electrolyte salt concentration of preferably 0.1 to 5.0 mol/L and more preferably 0.5 to 2.0 mol/L.

The plasticizer content in the polyelectrolyte is preferably 10 to 90 mass % and more preferably 30 to 80 mass %.

<Separator>

A separator can be also used in the lithium ion secondary battery according to aspects of the invention.

The material of the separator is not particularly limited, and use is made of, for example, woven fabric, non-woven fabric, and a fine porous film made of synthetic resin. Among these, a fine porous film made of synthetic resin is preferred, and in particular a polyolefin-based fine porous film is more preferred in terms of the thickness, film strength, and film resistance. Suitable examples of the polyolefin-based fine porous film include a polyethylene fine porous film, a polypropylene fine porous film, and a composite fine porous film thereof.

EXAMPLES

Aspects of the present invention are specifically described below with reference to examples. However, the invention is not limited to the examples described below.

Example 1

<<Preparation of Spherically-Shaped Graphite>>

Flake natural graphite (average particle diameter: 8 μm) as the raw material was sequentially passed through 5 pulverizing apparatuses (Hybridization system manufactured by Nara Machinery Co., Ltd.) that were installed in series. In each pulverizing apparatus, the pulverizing time was 5 minutes, and the circumferential speed of the rotor was 25 m/second. The raw material was pulverized and granulated, thereby being spherically-shaped in this manner.

Subsequently, the spherically-shaped raw material was subjected to heat treatment in a nitrogen atmosphere, and the spherically-shaped graphite was obtained. The heat treatment temperature was 600° C., and the heat treatment time was 2 hours.

The physical properties (such as the volume ratio between the fine grains and the coarse grains) of the obtained spherically-shaped graphite were determined by the above-described methods. The results are shown in Table 1 below.

<<Preparation of Spherically-Shaped Coated Graphite>>

A coal-tar pitch being a carbonaceous precursor was added to the obtained spherically-shaped graphite, and the mixture was heated to 50° C. and kneaded by a biaxial kneader for 30 minutes. The carbonaceous precursor was added in an amount with which a content of the finally obtained carbonaceous substance would meet the amount (10 mass %) shown in Table 1 below. Thereafter, the mixture was baked in a nitrogen flowing at 5 L/minute (in a non-oxidizing atmosphere) at 1,100 C for 10 hours using a tubular furnace. In this manner, obtained was the spherically-shaped coated graphite in which the spherically-shaped graphite was covered by the carbonaceous substance.

The physical properties (such as the average secondary particle diameter) of the obtained spherically-shaped coated graphite were determined by the above-described methods. The results are shown in Table 1 below.

<<Preparation of Negative Electrode>>

To water, 98 parts by mass of the spherically-shaped coated graphite (negative electrode material), 1 part by mass of carboxymethylcellulose (binder), and 1 part by mass of styrene butadiene rubber (binder) were added, followed by stirring, whereby a negative electrode mixture paste was prepared.

The prepared negative electrode mixture paste was applied over copper foil (thickness: 16 μm) in a uniform thickness and then dried in vacuum at 90° C., whereby a negative electrode mixture layer was formed. Next, the negative electrode mixture layer was pressurized at a pressure of 120 MPa by hand press. Thereafter, the copper foil and the negative electrode mixture layer were punched out into a circular shape with a diameter of 15.5 mm. A negative electrode (thickness: 60 μm, density: 1.20 g/cm$^3$) adhered to a current collector made of copper foil was prepared in this manner.

While the negative electrode was prepared, the degree of orientation of the negative electrode was determined according to the above-described method. The results are shown in Table 1 below.

<<Preparation of Positive Electrode>>

Lithium metal foil having been pressed against a nickel net was punched out into a circular shape with a diameter of 15.5 mm. A positive electrode comprising lithium metal foil (thickness: 0.5 mm) adhered to a current collector made of a nickel net was prepared in this manner.

<<Preparation of Battery for Evaluation>>

Figure 4:
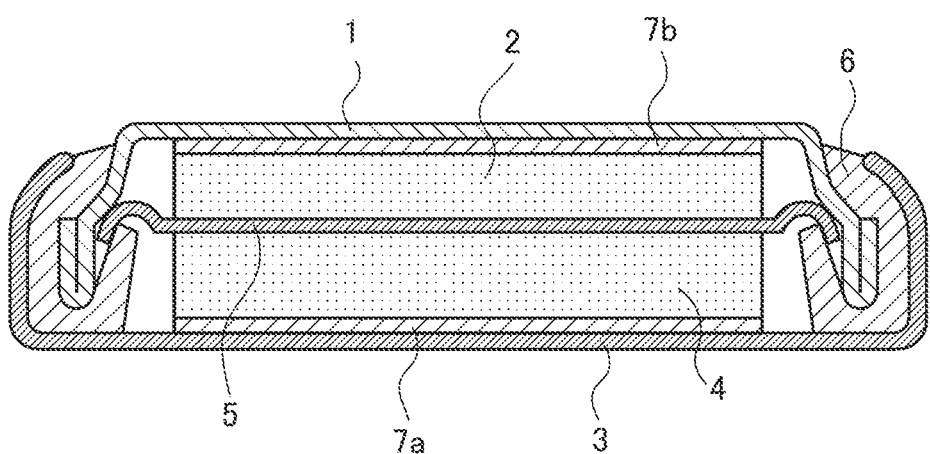
FIG. 4 is a cross-sectional view of a battery for evaluation prepared for battery property evaluation in Examples and Comparative Examples.

As a battery for evaluation, a button-type secondary battery as illustrated in FIG. 4 was prepared.

FIG. 4 is a cross-sectional view of the button-type secondary battery. In the button-type secondary battery illustrated in FIG. 4, circumferential portions of an exterior cup 1 and an exterior can 3 are swaged with an insulating gasket 6 being interposed therebetween, whereby a tightly sealed structure is formed. Inside the tightly sealed structure, a current collector 7a, a positive electrode 4, a separator 5, a negative electrode 2, and a current collector 7b are superposed in this order from the inner surface of the exterior can 3 toward the inner surface of the exterior cup 1.

The button-type secondary battery illustrated in FIG. 4 was prepared as described below.

First, into a mixed solvent comprising ethylene carbonate (33 vol %) and methylethyl carbonate (67 vol %), LiPF$_6$ was dissolved at a concentration of 1 mol/L, whereby the non-aqueous electrolytic solution was prepared. A polypropylene porous body (thickness: 20 μm) was impregnated with the prepared non-aqueous electrolytic solution, whereby the separator 5 impregnated with the non-aqueous electrolytic solution was prepared.

Next, the prepared separator 5 was held between the negative electrode 2 adhered to the current collector 7b made of copper foil and the positive electrode 4 adhered to the current collector 7a made of a nickel net so that they were laminated. Thereafter, the current collector 7b and the negative electrode 2 were accommodated in the exterior cup 1, while the current collector 7a and the positive electrode 4 were accommodated in the exterior can 3, and the exterior cup 1 and the exterior can 3 were put together. In addition, the circumferential portions of the exterior cup 1 and the exterior can 3 were swaged to be tightly sealed, with the insulating gasket 6 being interposed therebetween. The button-type secondary battery was prepared in this manner.

Using the prepared button-type secondary battery (battery for evaluation), the battery properties were evaluated though the charging-discharging test described below. The results are shown in Table 1 below.

In the following charging-discharging test, the process in which lithium ions are adsorbed and stored in the negative electrode material is assumed as charging, and the process in which lithium ions are released from the negative electrode material is assumed as discharging.

<<Charging-Discharging Test: Discharging Capacity and Initial Charging-Discharging Efficiency>>

First, constant-current charging at the current value of 0.9 mA was performed until the circuit voltage reached 0 mV. When the circuit voltage reached 0 mV, the constant-current charging was changed to constant-voltage charging, and the charging was continued until the current value reached 20 μA. Based on an amount of current carried during this process, the charging capacity (unit: mAh) was determined. Thereafter, the battery was rested for 120 minutes. Next, constant-current discharging at the current value of 0.9 mA was performed until the circuit voltage reached 1.5 V. Based on an amount of current carried during this process, the discharging capacity (unit: mAh) was determined. These processes were treated as the first cycle.

Based on the charging capacity and the discharging capacity in the first cycle, the initial charging-discharging efficiency (unit: %) was determined according to the following equation. The result is shown in Table 1 below.

Initial charging-discharging efficiency [%]=(discharging capacity/charging capacity)×100

<<Charging-Discharging Test: 45° C. Cycle Durability>>

Constant-current charging at 0.2 C was performed in a 45° C. temperature atmosphere until the circuit voltage reached 4.1 V. Thereafter, the battery was rested for 10 minutes.

Next, discharging at 0.5 C was performed until the circuit voltage reached 2.5 V, followed by a rest of 10 minutes, and discharging at 0.2 C was performed until the circuit voltage reached 2.5 V.

The charging and the discharging processes as above were repeated 100 times in total, and the ratio (45° C. cycle durability, unit: %) of the 100th discharging capacity to the initial discharging capacity was calculated.

The results are shown in Table 1 below. When this value is larger, cycle capacity-maintaining property can be rated as excellent.

Example 2

The number of the pulverizing apparatuses through which the raw material was passed was 3, and the pulverizing time and the circumferential speed of the rotor of each pulverizing apparatus were 10 minutes and 30 m/second, respectively. Except this change, the same procedure as that in Example 1 was employed. The results are shown in Table 1 below.

Example 3

The number of the pulverizing apparatuses through which the raw material was passed was 2, the pulverizing time and the circumferential speed of the rotor of each pulverizing apparatus were 10 minutes and 30 m/second, respectively, and the heat treatment temperature was 400° C. Except this change, the same procedure as that in Example 1 was employed. The results are shown in Table 1 below.

Example 4

The number of the pulverizing apparatuses through which the raw material was passed was 2, the pulverizing time and the circumferential speed of the rotor of each pulverizing apparatus were 10 minutes and 40 m/second, respectively, and the heat treatment temperature was 500° C. Except this change, the same procedure as that in Example 1 was employed. The results are shown in Table 1 below.

Example 5

The number of the pulverizing apparatuses through which the raw material was passed was 2, the pulverizing time and the circumferential speed of the rotor of each pulverizing apparatus were 15 minutes and 50 m/second, respectively, and the heat treatment temperature was 400° C. Except this change, the same procedure as that in Example 1 was employed. The results are shown in Table 1 below.

Example 6

The number of the pulverizing apparatuses through which the raw material was passed was 3, and the pulverizing time and the circumferential speed of the rotor of each pulverizing apparatus were 6 minutes and 40 m/second, respectively. Except this change, the same procedure as that in Example 1 was employed. The results are shown in Table 1 below.

Example 7

The number of the pulverizing apparatuses through which the raw material was passed was 5, the pulverizing time and the circumferential speed of the rotor of each pulverizing apparatus were 30 minutes and 50 m/second, respectively, and the heat treatment temperature was 400° C. Except this change, the same procedure as that in Example 1 was employed. The results are shown in Table 1 below.

Example 8

The number of the pulverizing apparatuses through which the raw material was passed was 5, the pulverizing time and the circumferential speed of the rotor of each pulverizing apparatus were 10 minutes and 50 m/second, respectively, and the heat treatment temperature was 400° C. Except this change, the same procedure as that in Example 1 was employed. The results are shown in Table 1 below.

Example 9

The heat treatment temperature when the spherically-shaped graphite was prepared was 850° C. Except this change, the same procedure as that in Example 1 was employed. The results are shown in Table 2 below.

Comparative Example 1

The number of the pulverizing apparatuses through which the raw material was passed was 7, the pulverizing time and the circumferential speed of the rotor of each pulverizing apparatus were 30 minutes and 50 m/second, respectively, and the heat treatment was not performed when the spherically-shaped graphite was prepared. Except this change, the same procedure as that in Example 1 was employed. The results are shown in Table 2 below.

Comparative Example 2

The number of the pulverizing apparatuses through which the raw material was passed was 7, the pulverizing time and the circumferential speed of the rotor of each pulverizing apparatus were 10 minutes and 50 m/second, respectively, and the heat treatment was not performed when the spherically-shaped graphite was prepared. Except this change, the same procedure as that in Example 1 was employed. The results are shown in Table 2 below.

Comparative Example 3

The number of the pulverizing apparatuses through which the raw material was passed was 7, the pulverizing time and the circumferential speed of the rotor of each pulverizing apparatus were 15 minutes and 80 m/second, respectively, and the heat treatment was not performed when the spherically-shaped graphite was prepared. Except this change, the same procedure as that in Example 1 was employed. The results are shown in Table 2 below.

Comparative Example 4

The number of the pulverizing apparatuses through which the raw material was passed was 5, the pulverizing time and the circumferential speed of the rotor of each pulverizing apparatus were 20 minutes and 60 m/second, respectively, and the heat treatment was not performed when the spherically-shaped graphite was prepared. Except this change, the same procedure as that in Example 1 was employed. The results are shown in Table 2 below.

Comparative Example 5

The number of the pulverizing apparatuses through which the raw material was passed was 5, the pulverizing time and the circumferential speed of the rotor of each pulverizing apparatus were 30 minutes and 60 m/second, respectively, and the heat treatment was not performed when the spherically-shaped graphite was prepared. Except this change, the same procedure as that in Example 1 was employed. The results are shown in Table 2 below.

Comparative Example 6

The number of the pulverizing apparatuses through which the raw material was passed was 7, the pulverizing time and the circumferential speed of the rotor of each pulverizing apparatus were 20 minutes and 60 m/second, respectively, the heat treatment was not performed when the spherically-shaped graphite was prepared, and the carbonaceous precursor was added in an amount with which an amount of the finally obtained carbonaceous substance would be 8 mass %. Except this change, the same procedure as that in Example 1 was employed. The results are shown in Table 2 below.

Comparative Example 7

The number of the pulverizing apparatuses through which the raw material was passed was 4, the pulverizing time and the circumferential speed of the rotor of each pulverizing apparatus were 5 minutes and 30 m/second, respectively, and the heat treatment was not performed when the spherically-shaped graphite was prepared. Except this change, the same procedure as that in Example 1 was employed. The results are shown in Table 2 below.

Comparative Example 8

The number of the pulverizing apparatuses through which the raw material was passed was 1, the pulverizing time and the circumferential speed of the rotor of the pulverizing apparatus were 10 minutes and 30 m/second, respectively, and the heat treatment was not performed when the spherically-shaped graphite was prepared. Except this change, the same procedure as that in Example 1 was employed. The results are shown in Table 2 below.

Comparative Example 9

The number of the pulverizing apparatuses through which the raw material was passed was 10, the pulverizing time and the circumferential speed of the rotor of each pulverizing apparatus were 20 minutes and 40 m/second, respectively, and the heat treatment was not performed when the spherically-shaped graphite was prepared. Except this change, the same procedure as that in Example 1 was employed. The results are shown in Table 2 below.

Comparative Example 10

The number of the pulverizing apparatuses through which the raw material was passed was 20, the pulverizing time and the circumferential speed of the rotor of each pulverizing apparatus were 50 minutes and 30 m/second, respectively, and the heat treatment was not performed when the spherically-shaped graphite was prepared. Except this change, the same procedure as that in Example 1 was employed. The results are shown in Table 2 below.

Comparative Example 11

The number of the pulverizing apparatuses through which the raw material was passed was 30, the pulverizing time and the circumferential speed of the rotor of each pulverizing apparatus were 20 minutes and 60 m/second, respectively, and the heat treatment was not performed when the spherically-shaped graphite was prepared. Except this change, the same procedure as that in Example 1 was employed. The results are shown in Table 2 below.

Comparative Example 12

The heat treatment temperature when the spherically-shaped graphite was prepared was 250° C. Except this change, the same procedure as that in Example 1 was employed. The results are shown in Table 2 below.

TABLE 1

| | | | Examples | | | | |
|---|---|---|---|---|---|---|---|
| | | | 1 | 2 | 3 | 4 | 5 |
| Production Conditions | Spherically shaping | Number of pulverizing apparatuses | 5 | 3 | 2 | 2 | 2 |
| | | Pulverizing time [min/apparatus] | 5 | 10 | 10 | 10 | 15 |
| | | Total pulverizing time [min] (=number of pulverizing apparatuses × pulverizing time) | 25 | 30 | 20 | 20 | 30 |
| | | Circumferential speed of rotor [m/sec] | 25 | 30 | 30 | 40 | 50 |
| | | Total pulverizing time × circumferential speed of rotor [m] | 37,500 | 54,000 | 36,000 | 48,000 | 90,000 |
| | Heat treatment | Heat treatment temp. [° C.] | 600 | 600 | 400 | 500 | 400 |
| Spherically-shaped Graphite | Volume ratio of primary particles [%] | Fine grains (not more than 0.8 μm) | 40.3 | 42.9 | 41.0 | 41.2 | 40.3 |
| | | Coarse grains (1.5~3.0 μm) | 11.4 | 8.0 | 10.5 | 10.8 | 16.1 |
| | Volume ratio of secondary particles [%] | Spherical particles | 8.0 | 9.7 | 19.1 | 25.1 | 9.8 |
| | | Rod-shaped particles | 38.2 | 37.0 | 29.5 | 21.7 | 37.6 |
| | Average secondary particle diameter [μm] | | 8.1 | 10.6 | 10.2 | 10.9 | 10.3 |
| | Specific surface area [m²/g] | | 8.9 | 7.3 | 8.0 | 8.1 | 9.2 |
| Spherically-shaped Coated Graphite | Carbonaceous substance content [mass %] | | 10.0 | 10.0 | 10.0 | 10.0 | 10.0 |
| | Average secondary particle diameter [μm] | | 10.5 | 12.3 | 12.1 | 12.4 | 12.1 |
| | Specific surface area [m²/g] | | 4.4 | 4.5 | 4.6 | 4.5 | 4.7 |
| | Mass of infiltrated dibutyl phthalate [g/cm³] | | 0.55 | 0.55 | 0.61 | 0.61 | 0.64 |
| | Pore volume [cm³/g] | | 0.014 | 0.014 | 0.015 | 0.015 | 0.017 |
| Battery Properties | Degree of orientation | | 6.2 | 7.0 | 2.8 | 2.5 | 5.5 |
| | Discharging capacity [mAh] | | 13.8 | 14.0 | 14.5 | 14.3 | 14.3 |
| | Initial charging-discharging efficiency [%] | | 83.6 | 83.6 | 83.4 | 83.8 | 83.1 |
| | 45° C. cycle durability [%] | | 92.6 | 92.8 | 92.5 | 92.3 | 92.0 |

| | | | Examples | | | |
|---|---|---|---|---|---|---|
| | | | 6 | 7 | 8 | 9 |
| Production Conditions | Spherically shaping | Number of pulverizing apparatuses | 3 | 5 | 5 | 5 |
| | | Pulverizing time [min/apparatus] | 6 | 30 | 10 | 5 |
| | | Total pulverizing time [min] (=number of pulverizing apparatuses × pulverizing time) | 18 | 150 | 50 | 25 |
| | | Circumferential speed of rotor [m/sec] | 40 | 50 | 50 | 25 |
| | | Total pulverizing time × circumferential speed of rotor [m] | 43,200 | 450,000 | 150,000 | 37,500 |
| | Heat treatment | Heat treatment temp. [° C.] | 600 | 400 | 400 | 850 |
| Spherically-shaped Graphite | Volume ratio of primary particles [%] | Fine grains (not more than 0.8 μm) | 41.1 | 42.3 | 42.5 | 40.4 |
| | | Coarse grains (1.5~3.0 μm) | 10.5 | 10.8 | 16.1 | 11.6 |
| | Volume ratio of secondary particles [%] | Spherical particles | 10.5 | 18.2 | 18.2 | 7.8 |
| | | Rod-shaped particles | 36.5 | 23.6 | 25.1 | 38.8 |
| | Average secondary particle diameter [μm] | | 9.2 | 8.9 | 9.4 | 8.4 |
| | Specific surface area [m²/g] | | 10.8 | 11.3 | 11.0 | 8.4 |
| Spherically-shaped Coated Graphite | Carbonaceous substance content [mass %] | | 10.0 | 10.0 | 10.0 | 10.0 |
| | Average secondary particle diameter [μm] | | 8.7 | 10.1 | 10.6 | 10.7 |
| | Specific surface area [m²/g] | | 4.3 | 5.0 | 4.9 | 4.1 |
| | Mass of infiltrated dibutyl phthalate [g/cm³] | | 0.55 | 0.64 | 0.65 | 0.48 |
| | Pore volume [cm³/g] | | 0.014 | 0.015 | 0.014 | 0.014 |
| Battery Properties | Degree of orientation | | 5.8 | 2.8 | 2.7 | 6.1 |
| | Discharging capacity [mAh] | | 13.9 | 14.3 | 14.2 | 14.0 |
| | Initial charging-discharging efficiency [%] | | 83.8 | 82.4 | 83.0 | 83.5 |
| | 45° C. cycle durability [%] | | 92.3 | 91.2 | 91.4 | 92.4 |

TABLE 2

| | | | Comparative Examples | | | | | |
|---|---|---|---|---|---|---|---|---|
| | | | 1 | 2 | 3 | 4 | 5 | 6 |
| Production Conditions | Spherically shaping | Number of pulverizing apparatuses | 7 | 7 | 7 | 5 | 5 | 7 |
| | | Pulverizing time [min/apparatus] | 30 | 10 | 15 | 20 | 30 | 20 |
| | | Total pulverizing time [min] (=number of pulverizing apparatuses × pulverizing time) | 210 | 70 | 105 | 100 | 150 | 140 |

TABLE 2-continued

|  |  |  |  |  |  |  |  |  |
|---|---|---|---|---|---|---|---|---|
|  |  | Circumferential speed of rotor [m/sec] | 50 | 50 | 80 | 60 | 60 | 60 |
|  |  | Total pulverizing time × circumferential speed of rotor [m] | 630,000 | 210,000 | 504,000 | 360,000 | 540,000 | 504,000 |
|  | Heat treatment | Heat treatment temp. [° C.] | N.A. | N.A. | N.A. | N.A. | N.A. | N.A. |
| Spherically-shaped Graphite | Volume ratio of primary particles [%] | Fine grains (not more than 0.8 μm) | 9.5 | 38.6 | 22.6 | 17.9 | 15.9 | 13.2 |
|  |  | Coarse grains (1.5~3.0 μm) | 34.9 | 14.3 | 28.8 | 26.9 | 30.8 | 31.4 |
|  | Volume ratio of secondary particles [%] | Spherical particles | 6.3 | 14.5 | 21.3 | 12.8 | 13.2 | 14.7 |
|  |  | Rod-shaped particles | 44.9 | 34.0 | 20.1 | 36.4 | 35.7 | 34.2 |
|  | Average secondary particle diameter [μm] |  | 6.1 | 6.8 | 8.0 | 8.5 | 7.9 | 7.0 |
|  | Specific surface area [m$^2$/g] |  | 10.4 | 10.3 | 9.8 | 10.7 | 10.7 | 10.0 |
| Spherically-shaped Coated Graphite | Carbonaceous substance content [mass %] |  | 10.0 | 10.0 | 10.0 | 10.0 | 10.0 | 8.0 |
|  | Average secondary particle diameter [μm] |  | 8.5 | 9.2 | 10.0 | 9.1 | 8.5 | 8.0 |
|  | Specific surface area [m$^2$/g] |  | 4.4 | 4.4 | 4.5 | 4.7 | 5.0 | 6.0 |
|  | Mass of infiltrated dibutyl phthalate [g/cm$^3$] |  | 0.70 | 0.70 | 0.70 | 0.70 | 0.70 | 0.72 |
|  | Pore volume [cm$^3$/g] |  | 0.022 | 0.019 | 0.016 | 0.018 | 0.018 | 0.022 |
| Battery Properties | Degree of orientation |  | 7.3 | 2.9 | 2.6 | 2.8 | 2.9 | 4.9 |
|  | Discharging capacity [mAh] |  | 14.2 | 14.1 | 14.3 | 14.1 | 14.3 | 14.3 |
|  | Initial charging-discharging efficiency [%] |  | 83.0 | 83.6 | 83.5 | 83.0 | 82.8 | 81.5 |
|  | 45° C. cycle durability [%] |  | 89.2 | 90.0 | 90.6 | 90.6 | 90.3 | 90.1 |

|  |  |  | Comparative Examples | | | | | |
|---|---|---|---|---|---|---|---|---|
|  |  |  | 7 | 8 | 9 | 10 | 11 | 12 |
| Production Conditions | Spherically shaping | Number of pulverizing apparatuses | 4 | 1 | 10 | 20 | 30 | 5 |
|  |  | Pulverizing time [min/apparatus] | 5 | 10 | 20 | 50 | 20 | 5 |
|  |  | Total pulverizing time [min] (=number of pulverizing apparatuses × pulverizing time) | 20 | 10 | 200 | 1000 | 600 | 25 |
|  |  | Circumferential speed of rotor [m/sec] | 30 | 30 | 40 | 30 | 60 | 25 |
|  |  | Total pulverizing time × circumferential speed of rotor [m] | 36,000 | 18,000 | 480,000 | 1,800,000 | 2,160,000 | 37,500 |
|  | Heat treatment | Heat treatment temp. [° C.] | N.A. | N.A. | N.A. | N.A. | N.A. | 250 |
| Spherically-shaped Graphite | Volume ratio of primary particles [%] | Fine grains (not more than 0.8 μm) | 40.1 | 48.9 | 40.3 | 72.0 | 47.0 | 40.6 |
|  |  | Coarse grains (1.5~3.0 μm) | 11.7 | 7.8 | 16.1 | 6.0 | 2.7 | 11.8 |
|  | Volume ratio of secondary particles [%] | Spherical particles | 8.3 | 9.8 | 17.8 | 20.0 | 21.0 | 7.2 |
|  |  | Rod-shaped particles | 37.8 | 37.6 | 25.8 | 23.0 | 22.0 | 39.3 |
|  | Average secondary particle diameter [μm] |  | 8.6 | 10.6 | 9.4 | 5.9 | 6.2 | 8.6 |
|  | Specific surface area [m$^2$/g] |  | 8.7 | 7.3 | 11.0 | 12.0 | 12.3 | 10.1 |
| Spherically-shaped Coated Graphite | Carbonaceous substance content [mass %] |  | 10.0 | 10.0 | 10.0 | 10.0 | 10.0 | 10.0 |
|  | Average secondary particle diameter [μm] |  | 10.3 | 12.3 | 10.6 | 8.1 | 8.3 | 10.9 |
|  | Specific surface area [m$^2$/g] |  | 4.4 | 4.5 | 0.8 | 6.5 | 6.0 | 4.5 |
|  | Mass of infiltrated dibutyl phthalate [g/cm$^3$] |  | 0.72 | 0.70 | 0.71 | 0.71 | 0.70 | 0.70 |
|  | Pore volume [cm$^3$/g] |  | 0.014 | 0.014 | 0.014 | 0.021 | 0.024 | 0.013 |
| Battery Properties | Degree of orientation |  | 6.1 | 7.0 | 2.7 | 2.5 | 2.4 | 6.3 |
|  | Discharging capacity [mAh] |  | 14.7 | 13.5 | 14.2 | 14.3 | 14.2 | 13.9 |
|  | Initial charging-discharging efficiency [%] |  | 83.1 | 83.6 | 83.0 | 82.5 | 83.4 | 83.1 |
|  | 45° C. cycle durability [%] |  | 90.0 | 90.5 | 90.3 | 90.1 | 90.0 | 90.9 |

<Summary of Evaluation Results>

As Tables 1 and 2 above show, Examples 1 to 9 where the volume ratio of the fine grains was more than 40.0% and not more than 70.0%, the volume ratio of the coarse grains was not less than 3.0% and not more than 17.0%, the pore volume was not more than 0.017 cm$^3$/g, and the mass of infiltrated dibutyl phthalate was less than 0.70 g/cm$^3$ had better cycle capacity-maintaining property than those of Comparative Examples 1 to 12 where at least one of these conditions was not satisfied.

REFERENCE SIGNS LIST

1: exterior cup
2: negative electrode
3: exterior can
4: positive electrode
5: separator
6: insulating gasket
7a: current collector
7b: current collector

The invention claimed is:

1. Spherically-shaped coated graphite comprising:
spherically-shaped graphite in which primary particles with an equivalent spherical diameter of not more than 0.8 μm have a volume ratio of more than 40.0% and not more than 70.0%, and primary particles with an equivalent spherical diameter of not less than 1.5 μm and not more than 3.0 μm have a volume ratio of not less than 3.0% and not more than 17.0%, in a particle size distribution of primary particles that is obtained using X-ray computed tomography; and
a carbonaceous substance covering the spherically-shaped graphite,
wherein a pore volume of pores with a pore size of not less than 7.8 nm and not more than 36.0 nm is not more than 0.017 cm3/g, and
a mass of infiltrated dibutyl phthalate in the spherically-shaped coated graphite is less than 0.70 g/cm3

2. The spherically-shaped coated graphite according to claim 1, wherein in the spherically-shaped graphite, a first group of secondary particles in a spherical shape have a volume ratio of not less than 3.0% and not more than 26.0%, and a second group of secondary particles in a rod shape have a volume ratio of not less than 20.0% and not more than 70.0%, in a particle shape distribution of secondary particles that is obtained using X-ray computed tomography.

3. The spherically-shaped coated graphite according to claim 1, wherein an average secondary particle diameter is not less than 5.0 μm and not more than 15.0 μm, and a specific surface area is not less than 0.5 m$^2$/g and not more than 10.0 m$^2$/g.

4. The spherically-shaped coated graphite according to claim 1, wherein the spherically-shaped graphite is formed of natural graphite processed into a spherical shape.

5. A negative electrode for a lithium ion secondary battery, wherein the negative electrode contains the spherically-shaped coated graphite according to claim 1.

6. A lithium ion secondary battery including the negative electrode according to claim 5.

7. The spherically-shaped coated graphite according to claim 2, wherein an average secondary particle diameter is not less than 5.0 μm and not more than 15.0 μm, and a specific surface area is not less than 0.5 m$^2$/g and not more than 10.0 m$^2$/g.

8. The spherically-shaped coated graphite according to claim 2, wherein the spherically-shaped graphite is formed of natural graphite processed into a spherical shape.

9. The spherically-shaped coated graphite according to claim 3, wherein the spherically-shaped graphite is formed of natural graphite processed into a spherical shape.

10. The spherically-shaped coated graphite according to claim 7, wherein the spherically-shaped graphite is formed of natural graphite processed into a spherical shape.

11. A negative electrode for a lithium ion secondary battery, wherein the negative electrode contains the spherically-shaped coated graphite according to claim 2.

12. A negative electrode for a lithium ion secondary battery, wherein the negative electrode contains the spherically-shaped coated graphite according to claim 3.

13. A negative electrode for a lithium ion secondary battery, wherein the negative electrode contains the spherically-shaped coated graphite according to claim 7.

14. A negative electrode for a lithium ion secondary battery, wherein the negative electrode contains the spherically-shaped coated graphite according to claim 4.

15. A negative electrode for a lithium ion secondary battery, wherein the negative electrode contains the spherically-shaped coated graphite according to claim 8.

16. A negative electrode for a lithium ion secondary battery, wherein the negative electrode contains the spherically-shaped coated graphite according to claim 9.

17. A negative electrode for a lithium ion secondary battery, wherein the negative electrode contains the spherically-shaped coated graphite according to claim 10.

* * * * *